United States Patent
Gaully et al.

(10) Patent No.: US 9,447,735 B2
(45) Date of Patent: Sep. 20, 2016

(54) METHOD OF CONTROLLING A TURBOMACHINE

(75) Inventors: Bruno Robert Gaully, Marolles en Hurepoix (FR); Cedrik Djelassi, Marolles en Hurepoix (FR); Darragh McGrath, Paris (FR); Jean-Michel Roux, Charenton le Pont (FR)

(73) Assignee: SNECMA, Paris (FR)

( * ) Notice: Subject to any disclaimer, the term of this patent is extended or adjusted under 35 U.S.C. 154(b) by 742 days.

(21) Appl. No.: 13/881,547

(22) PCT Filed: Oct. 17, 2011

(86) PCT No.: PCT/FR2011/052422
§ 371 (c)(1),
(2), (4) Date: Jun. 6, 2013

(87) PCT Pub. No.: WO2012/056144
PCT Pub. Date: May 3, 2012

(65) Prior Publication Data
US 2013/0255221 A1   Oct. 3, 2013

(30) Foreign Application Priority Data
Oct. 26, 2010   (FR) .................................... 10 58768

(51) Int. Cl.
*F02C 1/00* (2006.01)
*F02C 9/00* (2006.01)
*F02C 9/28* (2006.01)

(52) U.S. Cl.
CPC . *F02C 9/00* (2013.01); *F02C 9/28* (2013.01); *F05D 2270/096* (2013.01); *F05D 2270/101* (2013.01)

(58) Field of Classification Search
CPC .............. F02C 9/18; F02C 9/20; F02C 9/28; F02C 9/16; F02D 27/02; F02D 27/0223
See application file for complete search history.

(56) References Cited

U.S. PATENT DOCUMENTS

| 5,265,414 A | 11/1993 | Mouton |
| 5,471,831 A | 12/1995 | Rowe |
| 2003/0115883 A1 | 6/2003 | Myers, Jr. |
| 2013/0158831 A1* | 6/2013 | Djelassi .................... F02C 9/28 701/100 |

FOREIGN PATENT DOCUMENTS

| EP | 0 616 118 | 9/1994 |
| FR | 2 681 377 | 3/1993 |

OTHER PUBLICATIONS

International Search Report Issued Dec. 20, 2011 in PCT/FR11/52422 Filed Oct. 17, 2011.

* cited by examiner

*Primary Examiner* — Gerald L Sung
(74) *Attorney, Agent, or Firm* — Oblon, McClelland, Maier & Neustadt, L.L.P.

(57) ABSTRACT

A method of controlling a turbine engine, including: measuring a first temperature by a first temperature sensor; measuring a second temperature by a second temperature sensor; estimating a third temperature modeling the first temperature; and determining at least one control setpoint for at least one piece of variable-geometry equipment of the engine, as a function of the measured first temperature. The first sensor presents a time constant longer than a time constant of the second sensor. The method further detects ingestion of water or hail as a function of a drop in the measured second temperature; and when water or hail ingestion is detected, determines the control setpoint as a function of the estimated third temperature.

7 Claims, 1 Drawing Sheet

METHOD OF CONTROLLING A TURBOMACHINE

BACKGROUND OF THE INVENTION

The invention relates to the general field of aviation. In particular, the invention relates to a method of controlling an aircraft turbine engine in the event of the engine ingesting water or hail.

Typically, the operation of a turbine engine is regulated by an electronic control unit that performs a main regulation loop to servo-control a combination of measurements taken on the engine (speed, engine pressure ratio (EPR), . . . ) to a given setpoint that is a function of the desired thrust, with this being done by acting on the flow rate at which fuel is delivered to the combustion chamber. The electronic control unit also performs secondary regulation loops for pieces of equipment in the engine that present variable geometry.

The term "variable geometry" is used herein to designate a piece of equipment in which a dimension, a shape, a position, and/or a speed can be modified as a function of detected events or of defined parameters in order to act on the operation of the engine. Examples of pieces of variable-geometry equipment include valves for bleeding air from the compressor (valve having a variable opening), compressor stator vanes that are of variable pitch, turbine blades for which the clearance at the tip is variable, etc.

In particular, it is known to control the pitch angle of variable-pitch stator vanes (also known as variable stator vanes (VSV)) in a compressor as a function of a low speed XN25R, itself determined as a function of the speed XN25 of the high pressure spool and of the temperature T25 at the inlet to the compressor of the engine.

In the event of water or hail being ingested by the engine, the temperature T25 as measured by the corresponding sensor decreases, which leads to an increase in the low speed XN25R and thus to the vanes being opened to an excessive extent. Such extra opening may lead to surging of the compressor.

In order to avoid those drawbacks, it is known to use a probe for measuring the temperature T25, which probe presents an inertial separator for protecting the active portion of the probe from water and hail so as to avoid being disturbed in the event of water or hail being ingested. Nevertheless, a probe of that type presents high cost.

Proposals have also been made to devise relationships for controlling the opening angle of the vanes with a margin that is sufficient to avoid surging in the event of a disturbance to the measurement of the temperature T25. Nevertheless, the feasibility of such a solution involves other technical compromises.

Furthermore, it is known to detect the ingestion of water or hail in a turbine engine and to adapt the operation of the engine under such circumstances. For example, document FR 2 681 377 proposes detecting water ingestion as a function of a difference between the air temperatures at the compressor inlet (referenced T2 in that document) and at the outlet from the compressor T3. If water is ingested, the speed of the engine is increased.

OBJECT AND SUMMARY OF THE INVENTION

An object of the invention is to provide a method of controlling a turbine engine that does not present at least some of the above-mentioned drawbacks. In particular, an object of the invention is to enable a temperature sensor to be used that does not require an inertial separator.

To this end, the invention provides a method of controlling a turbine engine, the method comprising:
a step of measuring a first temperature by a first temperature sensor;
a step of measuring a second temperature by a second temperature sensor;
a step of estimating a third temperature modeling said first temperature; and
a step of determining at least one control setpoint for at least one piece of variable-geometry equipment of the engine, as a function of said measured first temperature;
the method being characterized in that said first sensor presents a time constant C1 longer than a time constant C2 of the second sensor, and the method further comprising:
a step of detecting ingestion of water or hail as a function of a drop in said measured second temperature; and
when water or hail ingestion is detected, a step of determining said control setpoint as a function of said estimated third temperature.

In the event of water or hail being ingested by the turbine engine, the first and second temperatures, as measured by the sensors, drop. More precisely, the second temperature drops faster than the first temperature since the second temperature presents a shorter time constant.

The faster drop of the second temperature makes it possible to detect water or hail ingestion before the first temperature has dropped sufficiently to disturb the determination of the control setpoint. It is then possible, in response to detecting the ingestion of water or hail, to determine the control setpoint as a function of the third temperature, i.e. to use the model of the first temperature instead of the first temperature itself, in order to ensure that the continuing drop in the first temperature does not disturb the determination of the control setpoint.

Thus, the invention makes it possible to use a first temperature sensor that may present a time constant that is relatively long. The first sensor may thus be of simple structure and does not require an inertial separator, and can thus present a low cost. Furthermore, the control relationship that enables the control setpoint to be determined does not need to take a safety margin into account in order to accommodate drops in the first temperature in the event of water being ingested.

In an implementation, a plurality of setpoints are determined for a plurality of pieces of equipment.

The first temperature may be a temperature T25 at the inlet of a compressor of the turbine engine and the second temperature may be a temperature T3 at the outlet from said compressor.

In an implementation, said first temperature sensor does not present an inertial separator.

By way of example, said control setpoint is an angle setpoint for a set of variable-pitch stator vanes of said compressor.

In an embodiment, when no water or hail ingestion is detected, the determination step comprises determining said control setpoint while using a first control relationship, and when water or hail ingestion is detected, the determination step comprises determining said control setpoint while using a second control relationship that is different from the first, and wherein for a given input temperature, the second control relationship delivers an angle setpoint that is more closed than does the first control relationship.

In corresponding manner, the invention also provides a computer program including instructions for executing a method of the invention as described when the program is executed by a computer. The invention also provides an electronic unit for controlling a turbine engine, said electronic unit including a memory containing such a computer program.

BRIEF DESCRIPTION OF THE DRAWING

The invention can be better understood on reading the following description given by way of non-limiting indication and with reference to the accompanying drawing, in which.

DETAILED DESCRIPTION OF IMPLEMENTATIONS

The invention is described below mainly in the context of its application to a gas turbine constituting an airplane thrust engine, e.g. as shown in highly diagrammatic manner in FIG. 1. Nevertheless, the invention is applicable to other turbine engines, in particular turbines for helicopters, industrial turbines, or turbines for auxiliary power units (APUs).

Figure 1:
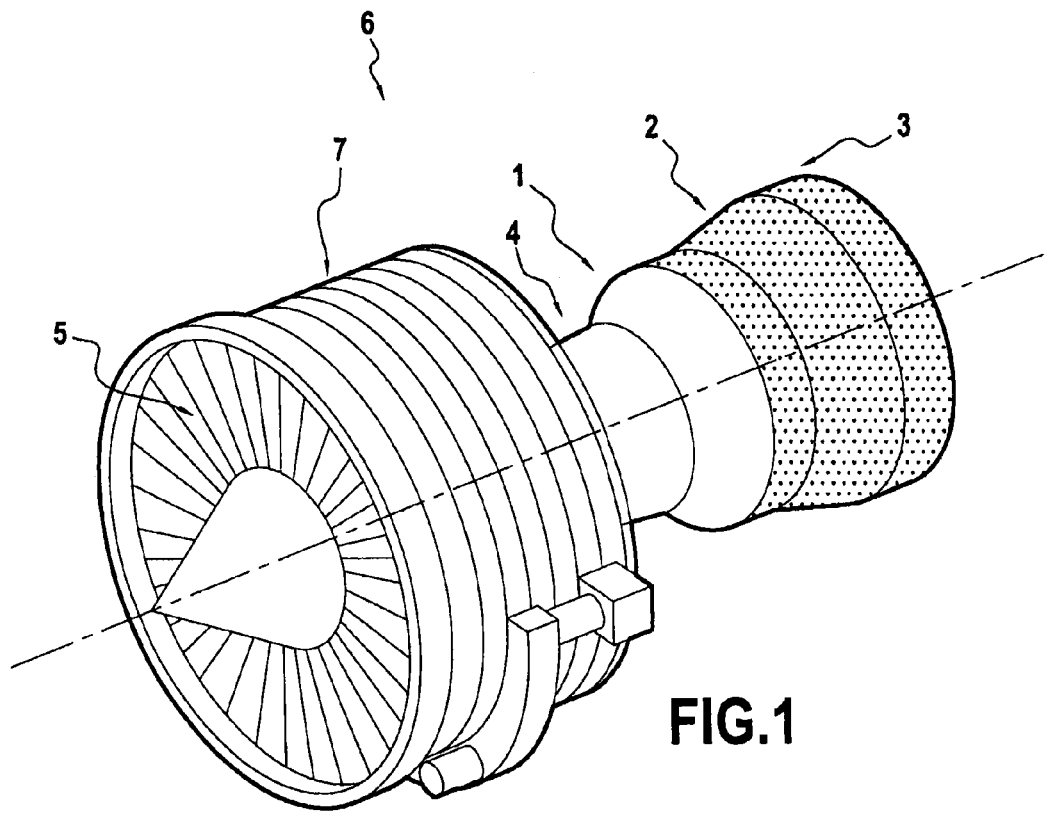
FIG. 1 is a perspective view of a turbine engine.

The turbine engine 6 shown in FIG. 1 comprises a combustion chamber 1, with the combustion gas from the chamber 1 driving a high pressure (HP) turbine 2 and a low pressure (LP) turbine 3. The HP turbine 2 is coupled by a shaft to an HP compressor 4 feeding the combustion chamber 1 with air under pressure, while the LP turbine 3 is coupled by another shaft to an LP compressor 7 and to a fan 5 at the inlet to the engine.

Figure 2:
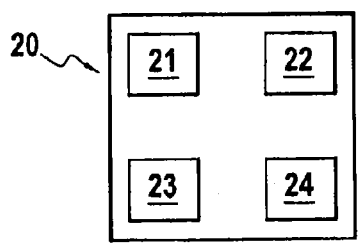
FIG. 2 is a diagram representing an electronic control unit in an embodiment of the invention.

The operation of the engine 6 is controlled by an electronic control unit 20, as represented in the diagram of FIG. 2, which unit performs a main regulation loop for servo-controlling a combination of measurements taken on the engine to a setpoint as a function of the desired thrust by acting on the rate at which fuel is delivered to the combustion chamber 1. The electronic unit also performs secondary regulation loops for variable-geometry equipment of the engine.

For this purpose, the electronic control unit 20 acquires signals representative of various measured operating parameters, and in particular:

the temperature T25 at the inlet to the HP compressor 4;
the temperature T3 at the outlet from the HP compressor 4;
the temperature T12 at the inlet of the fan 5;
ambient pressure Pamb; and
the speed of rotation N1 of the LP control 7 and of the LP turbine 3.

The electronic control unit 20 has the hardware architecture of a computer and it comprises a microprocessor 21, a read only memory (ROM) 22, a random access memory (RAM) 23, and an interface 24. In operation, the microprocessor 21 executes computer programs stored in the ROM 22 while using the RAM 23. The interface 24 enables the electronic control unit 20 to acquire the various above-specified signals, and to send signals representative of setpoints to determined controls.

The temperatures T25 and T3 are measured by temperature sensors. While they are taking measurements, temperature sensors generally suffer from a certain amount of inertia specific to each sensor, and this inertia depends in particular on the material from which the sensor is made and on its weight (or size). This inertia gives rise to a time offset between the moment when the measurement is taken by the sensor and the moment when the sensor delivers a signal in response to the measurement. There is said to be a "drag effect" in the measurement.

In known manner, the inertia of a sensor can be represented by a time constant. For example, document U.S. Pat. No. 5,080,496 proposes digitally modeling the inertia of a sensor with the help of a filter having settings determined by an estimate of the time constant of the sensor.

The temperature T25 is measured by a temperature sensor presenting a time constant C1 and the temperature T3 is measured by a temperature sensor presenting a time constant C2 that is shorter than C1.

For example, the maximum acceptable values for the time constant C1 relating to the temperature T25 are:

60 seconds (s) for an air flow of 20 kilograms per second and per square meter (kg/(s·m$^2$));
34.2 s for an air flow of 50 kg/(s·m$^2$); and
18 s for an air flow of 350 kg/(s·m$^2$);

whereas the maximum acceptable values for the time constants C2 relating to the temperature T3 are as follows:

4 s for an air flow of 20 kg/(s·m$^2$);
1 s for an air flow of 50 kg/(s·m$^2$); and
0.8 s for an air flow of 350 kg/(s·m$^2$).

The person skilled in the art may observe that the above-mentioned values for the time constant C1 are considerably longer than the usual values in the prior art.

Furthermore, the electronic control unit 20 can estimate the values of certain parameters by using models. For example, the temperature T25 can be estimated by a modelled temperature T25M. Models for the temperature T25M are known to the person skilled in the art and there is no need to give a detailed description. For example, the temperature T25M may be determined as a function of the temperature T12, of the speed of rotation N1, and of the pressure Pamb.

As explained above, ingesting water or hail can disturb the operation of the engine 6. Thus, the electronic control unit 20 performs a method of detecting the ingestion of water or hail, and it adapts the operation of the engine 6 when ingestion is detected. Several methods are known to the person skilled in the art for detecting the ingestion of water or hail and there is no need to describe them in detail. For example, ingestion may be detected from a drop in the temperature T3.

Figure 3:
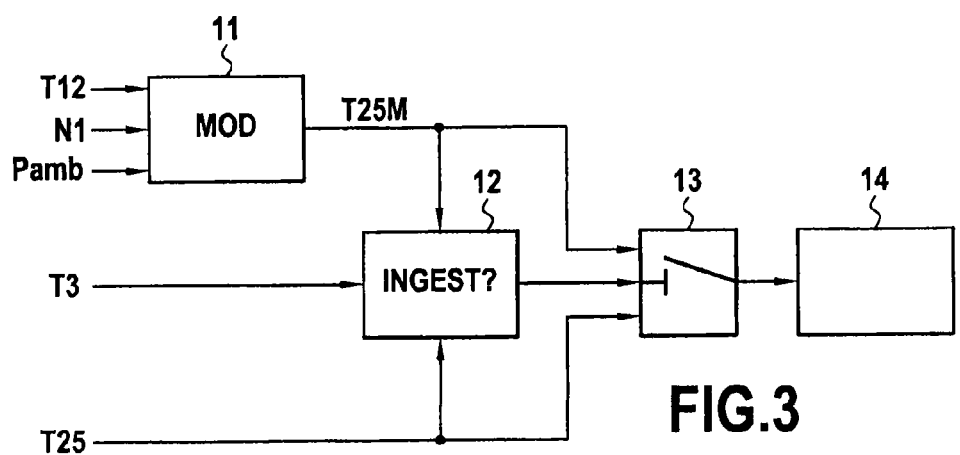
FIG. 3 is a block diagram of control means for performing a method in an implementation of the invention.

FIG. 3 is a block diagram of control means enabling the operation of the engine 6 to be controlled. By way of example, the control means of FIG. 3 may be performed by the electronic control unit 20 executing a computer program.

FIG. 3 shows a modeling module 11, a detection module 12, a selector 13, and a determination module 14.

The modeling module 11 models the temperature T25 and determines the temperature T25M, e.g. as a function of the temperature T12, the speed of rotation N1, and the pressure Pamb.

The detection module 12 serves to detect ingestion of water or hail as a function of the temperatures T3, T25, and T25M. More precisely, a drop in the temperature T3 serves to detect ingestion. Other parameters may also be used.

The selector 13 receives as inputs the temperatures T25 and T25M, together with the output signal from the detection module 12. When the detection module 12 indicates no ingestion, then the selector 13 outputs the signal for the temperature T25. When the detection module 12 indicates ingestion, then the selector 13 outputs the signal for the temperature T25M.

The determination module 14 determines a control setpoint for a piece of variable-geometry equipment in the engine 6, as a function of an input value delivered by the selector 13. In other words, if there is no ingestion, the control setpoint is determined as a function of the temperature T25, and if there is ingestion, then the temperature T25M is used instead of the temperature T25. Naturally, the determination module 14 may also make use of other parameters for determining the control setpoint.

The FIG. 3 control means operate as follows.

In the absence of water or hail being ingested, the selector 13 delivers the temperature T25 to the determination module 14.

In the event of water or hail being ingested by the engine, both of the temperatures T25 and T3 as measured by the sensors drop. More precisely, the temperature T3 drops more quickly than the temperature T25, since the sensor for the temperature T3 presents a time constant C2 that is shorter than the time constant C1 of the sensor for the temperature T25. In contrast, the temperature T25M does not drop, or at least it drops in a manner that is less marked than the temperature T25, since it is determined as a function of parameters that are not significantly disturbed by the ingestion.

The faster drop of the temperature T3 enables the detection module 12 to detect that water or hail has been ingested before the temperature T25 has dropped far enough to disturb the determination of the control setpoint by the determination module 14.

In response to detecting that water or hail has been ingested, the selector 13 switches over and thus delivers the temperature T25M to the determination module 14. The determination module 14 then uses the temperature T25M instead of the temperature T25 in order to determine the control setpoint. Thus, a continued drop in the temperature T25 does not disturb the determination of the controlled setpoint.

Thus, since the sensor measuring the temperature T25 presents a time constant C1 that is relatively long, the measured temperature T25 does not drop quickly in the event of water being ingested and can continue to be used temporarily for determining a control setpoint before ingestion is detected. This sensor may thus be simple in structure, not requiring an inertial separator, and it may be of low cost.

By way of example, the determination module 14 determines an angle setpoint for the variable-pitch vanes of the HP compressor 4, an opening position for a bleed valve, and/or an increase in the setpoint associated with thrust. Because of the relatively long time constant C1 and because of the selector 13, the input signal delivered to the determination module 14 does not drop significantly in the event of water or hail being ingested. Thus, the determination module 14 does not need to take account of a safety margin in order to accommodate drops in the measurement of the temperature T25 in the event of water or hail being ingested.

In a variant that is not shown, the determination module 14 receives as an input, in addition to the signal output by the selector 13, the signal output by the detection module 12, and the determination module 14 uses a first control relationship for determining the control setpoint in the absence of water ingestion, and a second control relationship different from the first in the event of water being ingested. For a given input temperature, the second control relationship delivers an angle setpoint that is more closed than does the first control relationship.

Thus, in this variant, extra closure is instigated in the event of ingestion in order to compensate for the increased risk of surging under such circumstances.

The invention is described above with reference to an implementation relating to the temperatures T25 and T3. In a variant, the invention may be applied to two other temperatures measured at distinct locations in a turbine engine.

The invention claimed is:

1. A method of controlling a turbine engine, the method comprising:
    measuring a first temperature by a first temperature sensor;
    measuring a second temperature by a second temperature sensor;
    estimating a third temperature modeling the first temperature;
    determining at least one control setpoint for at least one piece of variable-geometry equipment of the engine, as a function of the measured first temperature;
    the first sensor presents a time constant longer than a time constant of the second sensor; and the method further comprising:
    detecting ingestion of water or hail as a function of a drop in the measured second temperature;
    when water or hail ingestion is detected, determining the control setpoint as a function of the estimated third temperature; and
    controlling the at least one piece of variable-geometry equipment of the engine based on the determined control setpoint.

2. A control method according to claim 1, wherein the first temperature is a temperature at an inlet of a compressor of the turbine engine and the second temperature is a temperature at an outlet from the compressor.

3. A control method according to claim 2, wherein the first temperature sensor has an active portion that is not protected from water or hail by an inertial separator.

4. A control method according to claim 2, wherein the control setpoint is an angle setpoint for a set of variable-pitch stator vanes of the compressor.

5. A control method according to claim 4, wherein, when no water or hail ingestion is detected, the determining comprises determining the control setpoint while using a first control relationship, and when water or hail ingestion is detected, the determining comprises determining the control setpoint while using a second control relationship that is different from the first control relationship, and wherein for a given input temperature, the second control relationship delivers an angle setpoint that is more closed than does the first control relationship.

6. A non-transitory computer readable medium including computer executable instructions for executing a method of controlling a turbine engine, when executed by a computer, the method comprising:
    measuring a first temperature by a first temperature sensor;
    measuring a second temperature by a second temperature sensor;
    estimating a third temperature modeling the first temperature;
    determining at least one control setpoint for at least one piece of variable-geometry equipment of the engine, as a function of the measured first temperature;
    the first sensor presents a time constant longer than a time constant of the second sensor; and the method further comprising:

detecting ingestion of water or hail as a function of a drop in the measured second temperature;

when water or hail ingestion is detected, determining the control setpoint as a function of the estimated third temperature; and controlling the at least one piece of variable-geometry equipment of the engine based on the determined control setpoint.

7. An electronic unit for controlling a turbine engine, the electronic unit comprising a memory including a computer readable medium including computer executable instructions for executing a method of controlling the turbine engine, when executed by a computer, the method comprising:

measuring a first temperature by a first temperature sensor;

measuring a second temperature by a second temperature sensor;

estimating a third temperature modeling first temperature;

determining at least one control setpoint for at least one piece of variable-geometry equipment of the engine, as a function of the measured first temperature;

the first sensor presents a time constant longer than a time constant of the second sensor; and the method further comprising:

detecting ingestion of water or hail as a function of a drop in the measured second temperature;

when water or hail ingestion is detected, determining the control setpoint as a function of the estimated third temperature; and controlling the at least one piece of variable-geometry equipment of the engine based on the determined control setpoint.

* * * * *